United States Patent [19]

Borgren

[11] 4,324,984
[45] Apr. 13, 1982

[54] PORTABLE HYDROGENERATING APPARATUS

[75] Inventor: Peter M. Borgren, Duluth, Minn.

[73] Assignee: Hydrodynamic Energy Systems Corp., Superior, Wis.

[21] Appl. No.: 231,055

[22] Filed: Feb. 3, 1981

[51] Int. Cl.³ .................................................. F03B 13/10
[52] U.S. Cl. ........................................... 290/54; 290/43
[58] Field of Search ............... 290/52, 43, 54, 1 R; 415/122 R; 416/DIG. 4, 142; 417/344, 231

[56] References Cited

U.S. PATENT DOCUMENTS

| | | | |
|---|---|---|---|
| 1,247,520 | 11/1917 | Fessenden . | |
| 2,799,229 | 7/1957 | Ogles et al. | 417/231 |
| 4,092,827 | 6/1978 | Schneider . | |
| 4,117,676 | 10/1978 | Atencio | 290/52 |
| 4,149,092 | 4/1979 | Cros . | |
| 4,182,123 | 1/1980 | Ueda . | |
| 4,201,059 | 5/1980 | Feder . | |

Primary Examiner—J. V. Truhe
Assistant Examiner—Shelley Wade
Attorney, Agent, or Firm—Schwartz, Jeffery, Schwaab, Mack, Blumenthal & Koch

[57] ABSTRACT

Apparatus for generating hydroelectric power comprising a portable collector tube assembly which can be transported to the site of a water source having a waterfall sufficient in magnitude to provide a pressure head for driving a turbine generator. The tube assembly comprises telescopically arranged inner and outer tubes, and means for rotating the tube assembly and extending the inner tube so as to place the upper, extended end thereof in a position within and below the top of the waterfall so as to take advantage of the resulting hydrodynamic and hydrostatic forces.

16 Claims, 4 Drawing Figures

PORTABLE HYDROGENERATING APPARATUS

BACKGROUND OF THE INVENTION

The present invention relates as indicated to portable hydrogenerating apparatus, and relates more particularly to a novel apparatus which utilizes the potential energy of the head or pressure of the water for conversion into electrical energy.

It is of course common practice to utilize hydroelectric power plants which are driven by heads of water resulting from the damming of rivers, streams, lakes or the like so as to confine and temporarily store the water, together with controlled release of the water so as to provide the necessary head for converting the potential energy of the water into electrical energy. Large power dams are particularly prevalant in the western parts of the country, and have been utilized to produce vast amounts of electrical energy.

Dams of the type described have also served other useful purposes, for example, the creation of vast amounts of acreage of fresh water recreational areas, sources of irrigation, and flood control. However, in the dams of the type described, the dam is an essentially permanent construction, and extremely costly to construct, particularly where relatively large bodies of water are to be controlled. Moreover, the ecology of vast regions surrounding the dam is frequently affected, as a result of the damming and the consequent flooding of areas surrounding the dam. Environmental and ecological concern are becoming vastly more important in the decision making processes, and as a result it is becoming increasingly more difficult to obtain approval for dam sites. A further difficulty is that the damming operation necessarily controls, and normally restricts, the water which would otherwise be available downstream of the dam site, thereby creating controversial legal claims to the water rights.

A still further disadvantage of existing dam constructions is the substantial difficulty and economic cost of effecting dam repair. Frequently, release of the water behind the dam is necessary which can result in substantial amounts of water passing either downstream of the dam or laterally of the dam. Where the dammed-up water is used for irrigation, this obviously prevents a severe problem, not to mention the loss of electrical energy which results from the loss of potential energy, which loss continues until the water level has again reached its previous operable level.

The above problems have been to some extent dealt with in the prior art. In U.S. Pat. No. 4,182,123 to Tsuneo Ueda, there is disclosed a hydraulic power plant in which a penstock extends from the reservoir upwardly over the top of the dam and downwardly therefrom in a downstream direction to a water turbine. A vacuum pump is located in the region of the penstock positioned on top of the dam so as to provide a siphon effect in the penstock so as to draw the water from the reservoir upwardly through the penstock and then downwardly to the turbine. Thus, a more restricted path of water flow is provided, although the penstock must be utilized with an existing dam construction. Thus, the concept of portability is totally lacking in the Ueda disclosure.

U.S. Pat. No. 4,092,827 to Gerald J. Schneider discloses an apparatus for intercepting, containing and distributing rain water in areas where saline water is the only source of water supply. An elaborate system is provided for conserving and distributing the rainfall, with the system including a relatively small duct which communicates with a penstock and turbine for deriving electrical power. Again, however, the construction is relatively permanent and not adaptable to various environmental conditions wherein heads of water are naturally located and from which electrical energy can be derived.

SUMMARY OF THE INVENTION

With the above in mind, the principal feature of the present invention is the provision of a hydrogenerating apparatus which renders itself to a variety of both permanent and temporary installations, although the concepts of the invention particularly adapt the apparatus for use where electrical energy is temporarily required.

In accordance with the invention, water collecting structure, for example, in the form of a tube of the desired diameter, can be positioned below or within a water fall, with the water passing over the fall in turn passing by gravity through the collector tube and into the inlet of a turbine for deriving electrical energy. Both the tube for collecting the water and the turbine can be mounted on and controlled from a wheeled vehicle which can be positioned near the collection site. In accordance with one form of the invention, the portable collector can be motored to the site, with the collector being in collapsed position on a trailer. The collector can then be elevated and extended by hydraulic or pneumatic lifting means to position the open upper end of the tube below the area of potential or head energy, with a turbine being operatively connected to the bottom of the tube.

In accordance with a modified form of the invention, a wheeled vehicle can be positioned at substantially the same level as the water flow, with the collecting tube being in effect dropped from its upper end within the waterfall, and a turbine or turbines likewise lowered by means of expansion cables so as to receive the water under pressure head passing downwardly through the tube. This arrangement has obvious advantages where the terrain is such that access to the falls is difficult from the area around the bottom of the falls.

A still further feature of the present invention is that it is adaptable to a variety of environmental areas where potential energy is either available or can be made available. For example, in areas where relatively small waterfalls exist, the portable apparatus is particularly well adapted. However, it is also adaptable to river and stream environments wherein a part of the river could be diverted in a controlled manner so as to create potential energy in the form of a gravitational water drop, with the water being diverted through the portable hydrogenerating apparatus in accordance with the invention. Applicant is unaware of any existing prior art which employs a hydrocollecting device of the type described, and which is portable to adapt the same to many varying areas of possible use.

These and other objects of the invention will become apparent as the following description proceeds with particular reference to the application drawings.

BRIEF DESCRIPTION OF THE APPLICATION DRAWINGS

FIG. 1 is a partially diagrammatic side elevational view of one form of the present invention, illustrating hydrogenerating apparatus including a pivotally mounted and expansible hydro-collector assembly adapted to be pivoted from a substantially horizontal position thereof in which it is transported, to a substantially vertical position which it is adapted to receive water flow through the upper end thereof for operating a turbine;

DETAILED DESCRIPTION OF THE PREFERRED EMBODIMENTS

Figure 1:
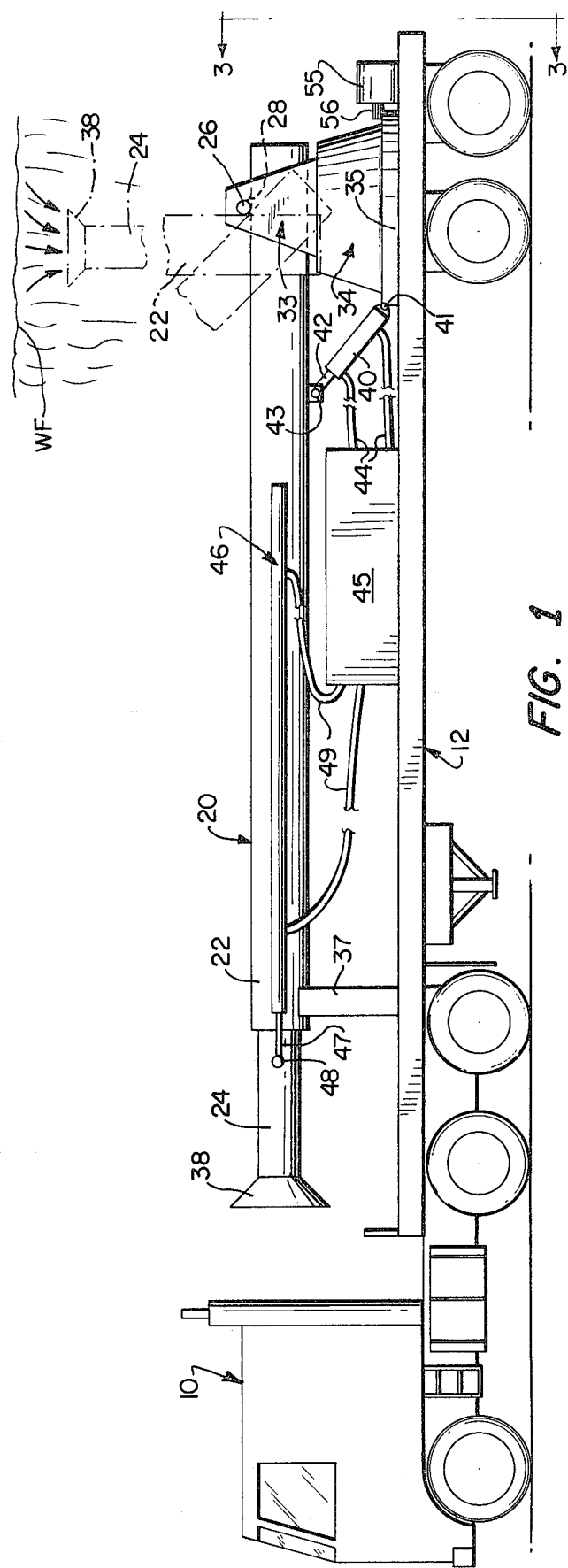
Figure 2:
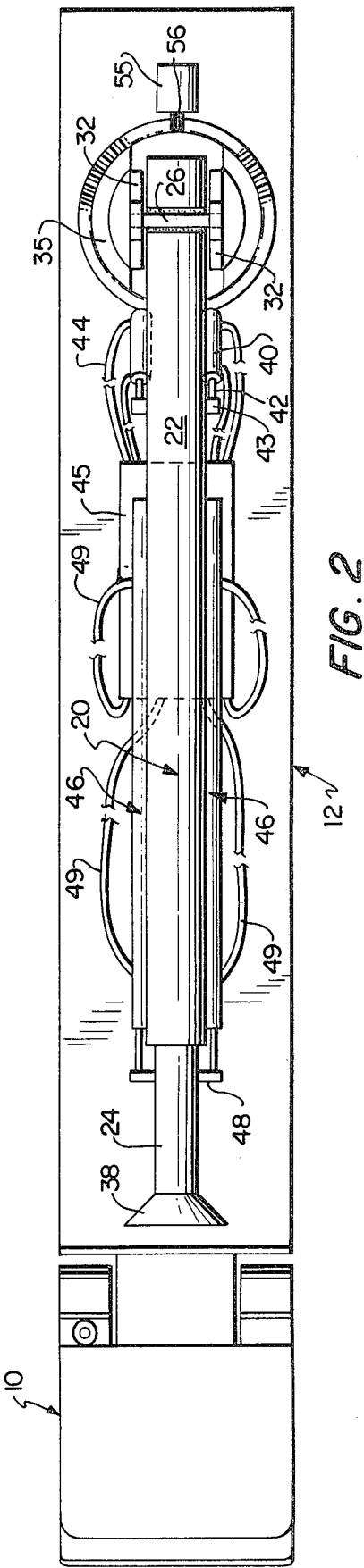
FIG. 2 is a top plan view of the hydro-collector assembly shown in FIG. 1.
Figure 3:
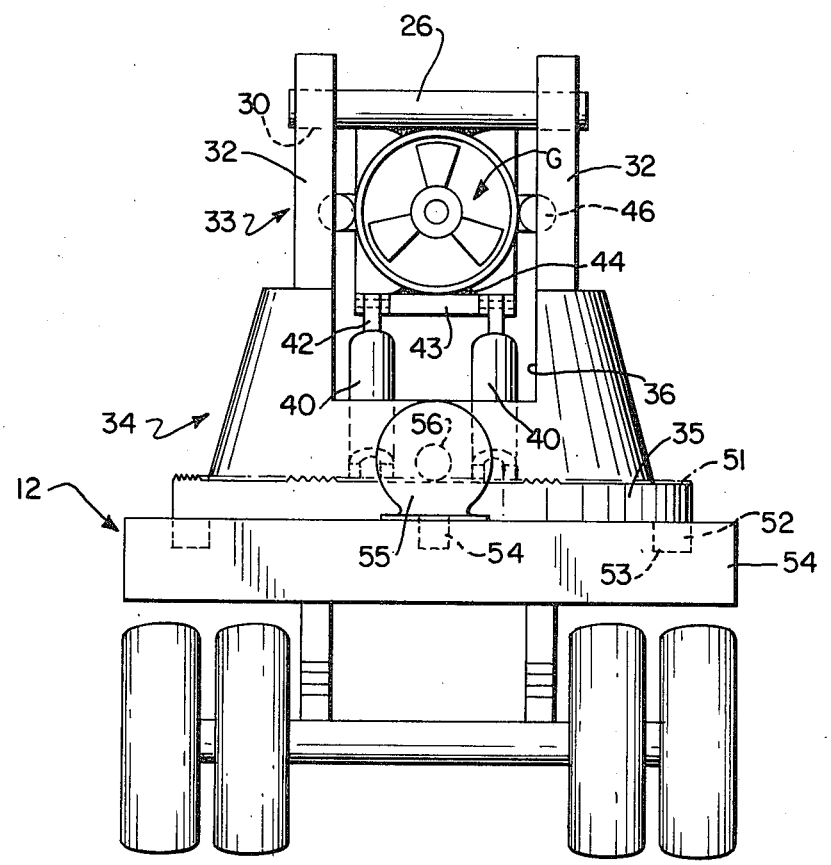
FIG. 3 is an end view looking in the direction of line 3—3 of FIG. 1.

Referring now in more detail to the application drawings, wherein like parts are indicated by like reference numerals, and initially to the form of the invention illustrated in FIGS. 1-3, a vehicle cab is generally indicated at 10 which has coupled thereto a trailer bed generally indicated at 12. The cab and trailer per se form no part of the present invention, and have accordingly been shown diagrammatically.

Mounted on the trailer 12 is a collector tube assembly generally indicated at 20 comprising an outer tube 22 and an inner tube 24 telescopically mounted within the other tube. The inner tube 24 is shown in its telescopically withdrawn position in FIGS. 1 and 2. The outer tube 22 is secured to pin 26 by weldments 28 or the like. The pin 28 extends through openings 30 provided therefor in the side walls commonly designated at 32 of an upper mounting member generally indicated at 33. A lower mounting member generally indicated at 34 supports the upper mounting member 33, with the lower mounting member 34 in turn being supported by a ring gear member 35 supported for rotating movement on the trailer bed as will be hereinafter described. Although the pin 26 is positioned above the tube as shown in FIGS. 1-3, it will be understood that the pin could be positioned at and secured to the bottom of the tube, or could extend diametrically through the tube, in which event sealing means would be provided to prevent leakage outwardly of the tube during use.

As best seen in FIG. 3, the upper mounting member 33 is generally open between the side walls 32, and the lower mounting member 34 is formed with a central recess 36. The spacing between the walls 32 of the upper mounting member, and the depth of the recess 36, with the recess extending longitudinally through the lower mounting member, provide room to accommodate pivotal upward movement of the tubes 22-24 when the same are elevated to a use position. In this regard, the tubes are shown horizontal in FIG. 1, in which position the forward ends of the tube are supported by a cradle 37 mounted on the trailer bed. FIG. 2 likewise shows the tubes in the solid line position as shown in FIG. 1. The tubes are shown in dashed lines in intermediate and fully raised positions in FIG. 1, with the fully raised position being broken for illustrative purposes. When raised, the inner tube 24 is positioned within the water passing over a waterfall WF, with the inner tube being formed with an enlarged flange or lip 38 at the upper end thereof to facilitate the collection process.

A turbine generator generally indicated at G is positioned within the bottom of the outer tube 20, and is adapted to be driven by the water passing downwardly through the tubes under hydrostatic and hydrodynamic pressure. The generator per se forms no part of the present invention, and it will be understood that it can be mounted either in the bottom of the tube 20, or adjacent to the collector tube assembly in which event the water passing downwardly through the tubes is delivered to the inlet side of the generator. Spent water can be discharged from the generator to the site, and any generated power can be taken off in any suitable, known manner. The generator has been shown in FIG. 3 only diagrammatically, and it will be understood that the generator can be of any suitable size and possess the desired operating characteristics.

It will be noted that as the tubes are pivoted to a vertical raised position, the vertical axis through the tube assemblies is offset from the longitudinal axis through the pin 26. This is due to the securing of the upper surface of the outer tube 22 to the pin, which rotates about a horizontal axis in the openings provided in the upper mounting member. The lateral movement of the axis through the tubes is fully accommodated by the space between the arms 32 of the upper mounting member and the recess 36 formed in the lower mounting member as above described.

In order to raise or lower the tubes, a pair of hydraulic cylinders commonly designated at 40 are provided, with the lower end of each cylinder being secured as shown at 41 to the ring gear 35. The pistons 42 of the cylinders engage a flange or bracket 43 which is secured to the bottom of the outer tube 22 and extends laterally outwardly so as to be engaged by the pistons 42, as can be seen in FIGS. 2 and 3. The bracket 43 can be secured to the outer tube in any suitable manner, as shown by welding 44 in FIG. 3. It will be understood that the capacity of the hydraulic cylinders and the length of the pistons 42 will be selected so as to fully accommodate the complete pivotal raising of the tube assemblies to the dashed line position as shown in FIG. 1. Hydraulic lines 44 extend to a hydraulic and electrical control unit diagrammatically indicated at 45 for operating the cylinders responsive to selective operator control.

As shown in FIG. 1, the inner tube 24 is in its telescopically withdrawn position relative to outer tube 22. Hydraulic cylinders commonly and generally designated at 46 are mounted on the exterior of the outer tube 22 at each side thereof (FIGS. 2 and 3), with each cylinder assembly 46 including a piston rod 47 secured to an arm 48 secured to and projecting from the periphery of the inner tube 24. Hydraulic lines 49 are interconnected between the hydraulic cylinders 46 and the hydraulic and electrical control unit 45 for selectively operating the cylinders 46 for lowering or raising the inner tube 24.

As above described, the tubes 22 and 24 are supported in cradle 37 during trnasportation of the collector assembly to and from the site. Since it may be desired to orient the tubes 22 and 24 in a vertical plane non-parallel to a vertical longitudinal plane through the trailer bed, means are provided for rotating the tubes relative to the trailer bed. As above described, the lower support member 34 is mounted on ring gear 35, which comprises an enlarged diameter support member formed with a ring gear segment 51 at the periphery thereof. An annular downwardly depending flange 52 is formed on the ring gear at the periphery thereof, which extends into an annular recess or groove 53 formed in the trailer bed 54. The annular ring 52 thus forms a thrust bearing for the ring, and a central thrust bearing 54, coaxial with the ring gear, extends into an opening provided therefor in the trailer for centering the ring gear during rotation.

Positioned rearwardly of the lower mounting member is a motor 55 the output shaft of which drives a pinion gear 56 which engages the gear teeth 51 of the ring gear. The motor is preferably electrically operated and reversible, whereby the pinion can rotate the ring gear, and consequently the lower and mounting members, in either direction so as to correspondingly move the tubes 22 and 24. It will be apparent that prior to such rotation, the tubes will be lifted from the front cradle 37 so as to free the same for rotative movement. In this manner, the tubes can be rotated to the preferred orientation prior to raising the tube assemblies and extending the inner tube 24, thereby permitting the tube 24 to be placed as closely as possible to the waterfall. It will be understood that the hydraulic lines 44 and 49 are provided with sufficient slack so as to permit rotation of the mounting members and the tubes relative to the hydraulic and electrical control unit 45 which is mounted on the trailer bed. As previously described, the hydraulic cylinders 40 are mounted at their lower ends to the gear ring and thus rotate with the gear ring and the outer tube 22 to which they are connected at their upper end.

The manner in which the FIGS. 1–3 form of the invention operates should be apparent from the above description. Where access to the waterfall is available at the bottom of the fall, the cab and trailer can be backed in and properly located so that subsequent raising, and orientation as needed, of the collector assembly 20 will position the outer tube 24 within the water flow thereby directing water downwardly through the collector tubes 24 and 22, and into the turbine G. The ability to locate the collector tube assembly at otherwise non-utilizable sites is of course an important feature of the invention, and there are a vast number of waterfall environments which are adaptable to the present invention. The invention can be used for military, municipal, or even private use, particularly where temporary electrical power is needed. The tube assembly can be quickly positioned at the site and raised, and can likewise be quickly and conveniently lowered when the need for the temporary electrical power has been eliminated. The entire system is self-contained, with the only requirement being that electrical connections be made to the turbine generator for taking off the current produced.

Although the FIGS. 1–3 form of the invention has illustrated the incoming water flow as gravitating directly to the turbine inlet, it will be understood that the flow could, if desired, be diverted to a temporary storage means, for example, a portable storage tank, from which the water could be delivered to the turbine under hydrostatic pressure. The arrangement would necessarily involve additional equipment but would provide the advantage of permitting uniform flow of water under hydrostatic pressure to the turbine generator.

Figure 4:
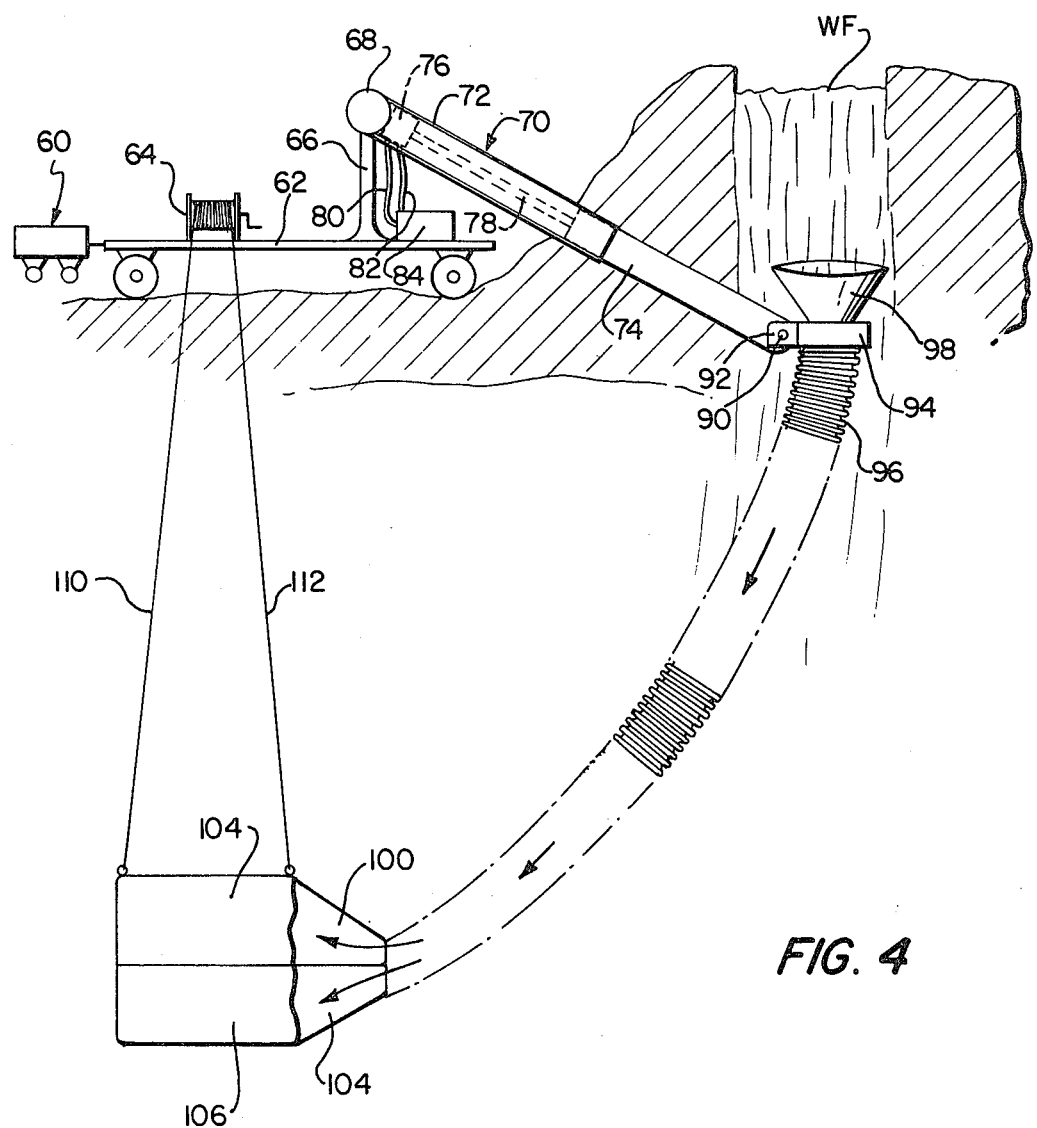
FIG. 4 is a partially diagrammatic side elevational view of a modified form of the invention in which the hydro-collector is supported by vehicle means mounted generally proximate the level of the waterfall.

As above explained, it may be difficult in certain conditions to position the portable apparatus at the bottom of the waterfall as shown in FIGS. 1–3. It is therefore desirable to provide a similarly portable hydro-collecting apparatus which can be positioned as necessary either approximately at the level of the waterfall, or intermediate the height of the fall. FIG. 4 shows a modification designed for that purpose and reference is now made thereto.

A vehicle cab is shown fragmentarily and diagrammatically at 60, and a trailer 62 is operatively connected thereto in any suitable manner. Mounted on the trailer are a winch 64 and a vertically extending support post 66, with the upper end 68 thereof having operatively connected thereto a boom assembly generally indicated at 70. The assembly includes an outer tube 72 and an inner tube 74 telescopically received within the outer tube. Mounted within the tube 72 is a hydraulic piston and cylinder assembly including a cylinder 76 and a piston rod 78. Hydraulic lines 80 and 82 communicate with the respective ends of the hydraulic cylinder, with the lines being connected at their opposite ends to a hydraulic unit diagrammatically shown at 84. It will be understood that the hydraulic unit 84 and the hydraulic connections thereto, including the hydraulic cylinder 76 and piston 78, can comprise conventional equipment which per se does not form part of the present invention. The hydraulic system has accordingly been shown schematically in FIG. 4. The tubes 72 and 74 are also rotatable about a vertical axis through the post so that the tubes can be oriented in the most desirable position relative to the water source.

The cylinder 74 is provided at its outer end with a pin 90 which extends outwardly at either side of the cylinder for attaching the ends 92 of a bracket 94 which is generally circular in cross-section in its outer region. Extending downwardly through the bracket is a flexible water collecting tube 96 the upper end of which is formed with a flared mouth 98. The bottom end of the tube 96 is operatively connected to cowlings 100 and 102 which function to split the water flow into turbine generators 104 and 106, respectively. As shown in FIG. 4, the flared mouth 98 is shown positioned within the waterfall WF, at either side of which is shown a rock outcropping through which the water passes. Water delivered to the mouth 98 passes downwardly through the tube 96, and due to the hydrodynamic and hydrostatic forces, the water passing through the cowlings 100 and 102 serve to drive the turbine generators 104 and 106 thereby producing electrical energy. The turbine generators per se form no part of the present invention, and it will be understood that any generators of suitable size and capacity will suffice. It will be understood that the turbine generators will be selected so as to provide optimum electrical energy output. Although two turbine generators have been shown, with the water flow being split by the cowlings 100 and 102, it will be apparent that a single turbine generator, or more than two generators may be alternately employed depending on use conditions.

The turbine generators and cowlings are adapted to be lowered to the desired position by means of cables 110 and 112 which are wrapped around the winch 64. When the equipment is being transported to or from the installation site, the turbine generators and cowling can be raised and stored on the trailer frame. When the system is set up, the turbine generators and cowling are lowered by the cables to the desired position, which will of course depend to some extent on the location of the trailer from the waterfall. As noted, the tube 96 is flexible thereby permitting movement of the turbine generators relative to the collecting tube 96 so as to provide an optimum set up condition.

In FIG. 4 the inner tube 74 is shown fully extended thereby permitting the mouth 98 of the tube to be positioned within the waterfall. During transportation, the tube 74 can be withdrawn so as to place the lower end of the same and the bracket 94 above ground level. In addition, the tube 96 can be disconnected at the lower end thereof from the cowling members 100 and 102 and removed from the bracket 94, and stored separately either on the trailer or elsewhere.

Although a hydraulic cylinder assembly has been shown for positioning the collecting tube, it will be understood that other forms of mechanical moving and mounting means could alternatively be employed. Thus, a system of interconnected and pivoted links could be provided for that purpose and would permit the mouth 98 and the upper portion of the tube to be moved toward the trailer and raised relative thereto for convenient transportation. The tube 74 is preferably withdrawn simultaneously with the raising of the cables 110 and 112, with the resulting variable spacing being accommodated by the flexibility of the tube. If desired, the tube 96 can be formed of a collapsible construction, for example, by a heavy coiled wire around which is secured material to form the tube. This accordion-type construction readily permits the necessary expansion and contraction of the tube as it is raised and lowered relative to the turbine generators.

As above noted, the FIG. 4 form of the invention, similar to FIGS. 1-3, is particularly adapted to civilian and military use where temporary sources of electrical energy are necessary or desirable. The FIG. 4 form of the invention is especially adaptable to environments wherein the water collecting tube and turbine generators cannot be positioned at the bottom of the falls. Thus, where access can be had to areas adjacent the top or intermediate elevations of the falls, permitting ingress and egress of the equipment, the suspension type system can be quickly and easily set up. Due to the flexible, and preferably collapsible, nature of the tube 96 and the ability to suspend the turbine generators at the desired height, a highly flexible arrangement is provided. Although not shown, it will be understood that the electrical energy produced by the turbine generators can be tapped in any suitable known fashion.

I claim:

1. Portable hydrogenerating apparatus comprising:
   (a) a transportable support vehicle,
   (b) portable tube means mounted on said support vehicle and adapted to be transported to and from a site having a potential energy water source,
   (c) means for moving and supporting said portable tube means so as to position the upper end thereof in the path of water flow from said water source, the water flowing gravitationally through said tube means thereby providing a pressure head, and
   (d) transportable turbine generator means associated with the discharge end of said tube means and receiving water under head pressure from said tube means, whereby electrical energy can be produced.

2. The apparatus of claim 1 wherein said portable tube means comprise an outer tube and a relatively reduced diameter inner tube positioned within said outer tube for telescopic movement relative thereto, said inner tube being withdrawn into said outer tube for transportation of said apparatus, and being extendable at the site, and means for extending or withdrawing said inner tube relative to said outer tube.

3. The apparatus of claim 2 wherein said means for withdrawing or extending said inner tube comprises hydraulic cylinder means mounted on said outer tube, said hydraulic cylinder means including piston means operatively connected to said inner tube, and hydraulic circuit means operatively communicating with said hydraulic cylinder so as to selectively withdraw or extend said inner tube.

4. The apparatus of claims 2 or 3 wherein said means for moving and supporting said inner and outer tubes comprises a hinge pin having a generally horizontal axis and positioned for rotation about said axis, said outer tube being rigidly secured to said hinge pin, and means for raising and lowering said inner and outer tubes about an axis through said hinge pin, whereby said tubes can be raised at the site to a generally vertical position, with said inner tube being thereafter extended by said hydraulic cylinder means for optimal positioning adjacent the water source.

5. The apparatus of claim 4 wherein said hinge pin is rotatably supported in an upper mounting member which is in turn supported on a lower mounting member positioned on the support vehicle, said upper mounting member and lower mounting member being constructed and arranged so as to provide a central recess aligned with said outer tube so as to accommodate the rotation of said tubes about said longitudinal axis.

6. The apparatus of claim 5 wherein said upper mounting member comprises a pair of spaced arms having openings through which said hinge pin extends, and said lower mounting member includes a central recess having a transverse dimension comparable to the spacing of said side walls of said upper mounting member, with said recess being of a depth to accommodate pivotal movement of said outer tube to a fully raised position.

7. The apparatus of claims 2 or 3 in which said turbine generator means is positioned at the bottom of said outer tube so as to receive water under head pressure passing downwardly through said inner and outer tubes when the same are in a raised position at the site.

8. The apparatus of claim 5 wherein said lower mounting member is mounted on a ring gear the peripheral top edge of which is provided with teeth, means formed on said ring gear and said support vehicle to accommodate rotation of said ring gear so as to correspondingly rotate said tubes, and means engaging the peripheral teeth of said ring gear for rotating the same.

9. The apparatus of claim 8 wherein said means formed on said ring gear and said support vehicle for accommodating rotation of said ring gear comprises an annular downwardly projecting thrustbearing formed at the periphery of said ring gear, and a complimentary groove formed in said support vehicle, and a central thrustbearing extending into an opening provided therefor in said support vehicle, whereby said ring gear has bearing support through said support vehicle during rotation thereof.

10. The apparatus of claims 8 or 9 wherein said means for rotating said ring gear comprises a drive motor mounted on said support vehicle, and a pinion gear driven by said drive motor and engaging the peripheral teeth of said ring gear, said drive motor being reversible whereby said ring gear can be rotated in opposite directions to orient said tubes as desired depending on the relative positioning of the support vehicle and the water source.

11. The apparatus of claim 8 wherein said means for raising and lowering said tubes comprises second hydraulic cylinder means operatively connected at one end to said ring gear and having extendable pistons the outer ends of which are operatively secured to said inner tube, and means for supplying hydraulic fluid to said second hydraulic cylinders for selectively raising or lowering said tubes.

12. The apparatus of claim 1 wherein said portable tube means comprises an outer tube and a relatively reduced inner tube arranged for telescopic movement within said outer tube, hydraulic cylinder means for operating said inner tube, said portable tube means further including a flexible tubular structure operatively connected to the outer end of said inner tube and adapted to be positioned so as to receive water under head pressure at the water source, the lower end of said flexible tubular structure being operatively connected to turbine means whereby water passes under hydrodynamic and hydrostatic pressure from said water source downwardly through said flexible tubular structure into said turbine means for driving the same and deriving electrical energy.

13. The apparatus of claim 12 wherein said means operatively connecting said flexible tubular structure to said inner tube comprising a bracket extending around the upper end of said flexible tubular structure and being pivotally mounted on said inner tube, being flexible tubular structure being formed with a flared outer flange or mouth at the upper end thereof to facilitate water collection.

14. The apparatus of claim 12 wherein said outer tube is pivotally mounted on a support post securely mounted on said support vehicle, the horizontal axis about which said tubes rotate being elevated above the deck of the support vehicle whereby said inner tube when extended, if desired, can be positioned below the plane of said deck so as to accommodate said apparatus to varying water source locations.

15. The apparatus of claim 12 wherein said turbine means is operatively connected to suspension cables extending around a winch mounted on said support vehicle, whereby said turbine generating means can be lowered below said support vehicle to the desired position relative to the extension of said inner tube and said collapsible tubular structure.

16. The apparatus of claim 12 wherein said support post is constructed and arranged to permit rotation of said inner and outer tube about a generally vertical axis through said support post whereby said tubes can be oriented as desired relative to a vertical longitudinal plane through said support vehicle, and the location of the water source.

* * * * *